United States Patent Office 3,419,576
Patented Dec. 31, 1968

3,419,576
CYCLOALIPHATIC SUBSTITUTED 1,2,3,4,9,9-HEXACHLORO - 1,4,4a,5,6,7,8,8a - OCTAHYDRO-1,4 - METHANONAPHTHALENE - 6,7-DICARBOXIMIDES
Carleton W. Roberts, Midland, and Gale D. Travis, Shepherd, Mich., assignors to The Dow Chemical Company, Midland, Mich., a corporation of Delaware
No Drawing. Filed Dec. 23, 1966, Ser. No. 604,157
5 Claims. (Cl. 260—326)

ABSTRACT OF THE DISCLOSURE

The present invention is directed to a cycloaliphatic substituted dicarboxamide compound of the formula:

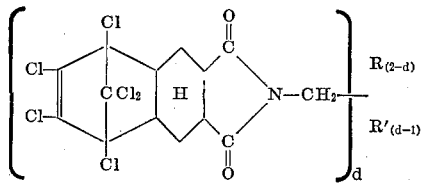

wherein R represents 2-(aminomethyl)cyclobutyl or 2-(cyclohexylamino)ethyl, R' represents 1,2-cyclobutylene, and $d$ represents an integer of from 1 to 2, both inclusive; and, where $d$ represents 1, the corresponding hydrochloride salt. The products of the present invention are useful as agents to control the growth of plants.

DETAILED DESCRIPTION OF THE INVENTION

As set forth hereinabove in the abstract, the present invention is directed to a cycloaliphatic substituted dicarboxamide compound of the formula

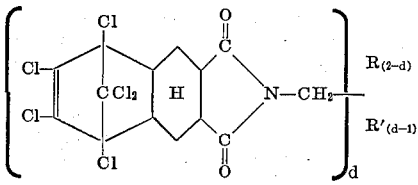

wherein R represents 2-(aminomethyl)cyclobutyl or 2-(cyclohexylamino)ethyl, R' represents 1,2-cyclobutylene, and $d$ represents an integer of from 1 to 2, both inclusive; and, where $d$ represents 1, the corresponding hydrochloride salt.

The products of the present invention are crystalline solids at room temperature, or, in the instance where R=2-(cyclohexylamino)ethyl, in the free amine form, a wax at room temperature. The products of the present invention are prepared by the reaction of 1,2,3,4,9,9-hexachloro-1,4,4a,5,6,7,8,8a-octahydro - 1,4 - methanonaphthalene-6,7-dicarboxylic anhydride (hereinafter the "anhydride");

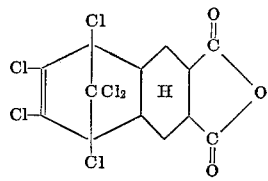

with an amine reactant which is 1,2-cyclobutanedimethylamine (when in the desired product $d$ is 2, or $d$ is 1 and R is 2-(aminomethyl)cyclobutyl) and which is 3-(cyclohexylamino)propylamine (where $d$ is 1 and R is 2-(cyclohexylamino)ethyl). The reaction is carried out in the presence of an inert liquid as a reaction medium. The employment of such medium, or the identity of the inert liquid if employed, is not critical; however, the use of the medium provides for the dispersion and intimate contacting of the reactants, and is preferred. Representative inert liquids include hydrocarbons, such as benzene, hexane, and toluene; chlorinated hydrocarbons, such as dichloromethane; ethers; ketones, such as acetone; and N,N-disubstituted amides, such as dimethylformamide. Preferably, acetone or dimethylformamide is employed as inert liquid reaction medium.

The reaction of the anhydride and amine reactant goes forward at temperatures over a wide range, for example, from 0° to 200° C. Generally, though, temperatures in the range of 20° to 160° C. are preferred. The reaction goes forward under atmospheric pressures of a wide range; however, no advantage ordinarily results from the use of subatmospheric or superatmospheric pressures, and, therefore, the preparation is ordinarily carried out at atmospheric pressures.

The amount of the reactants to be employed are not critical, some of the desired product resulting when the reactants are employed in any amounts. The reactants are consumed in amounts which represent equimolecular proportions, where $d=1$, and in amounts which represent one molecular proportion of amine reactant and two molecular proportions of anhydride, where $d=2$; it is usually preferred to supply the anhydride reactant and the amine reactant in such amounts. The reaction results in the preparation of the desired product, in the free amine form where $d$ represents 1, and of water as byproduct.

In carrying out the reaction, the reactants are contacted together, conveniently by adding one reactant to the other reactant in inert liquid reaction medium. The reaction goes forward readily, and is generally complete upon the completion of the contacting of the reactants. However, it is sometimes preferred to permit the reaction mixture to stand for a period of time to assure completion of the reaction. Following the completion of the reaction, or when the reactants have been contacted for as long a period of time as it is desired, the product-containing reaction mixture can be employed for the useful purposes of the present invention. Alternatively, the product can be separated from the reaction mixture by conventional separation procedures, such as, for example, filtration, decantation, evaporation under subatmospheric pressure of the inert liquid reaction medium, and the like.

The separated product can be employed for the useful purposes of the present invention, or can be purified by conventional procedures before being so employed. Representative purification procedures include washing with an appropriate liquid which is a solvent for impurities but not for the product; recrystallization; and the like.

As noted, those products of the present invention wherein $d$ represents 1 can exist either as a free amine or as a hydrochloride salt. The salt form is readily achieved by reacting the free amine with hydrogen chloride. Conveniently, the reaction of free amine and hydrogen chloride is carried out by dispersing the former in a reaction medium, such as those described foregoing, and bubbling in anhydrous hydrogen chloride. The resulting hydrochloride salt form of the product is separated, and if desired, purified, in conventional procedures.

The following examples illustrate the best mode now known for the present invention and will enable those skilled in the art to practice the same.

Example 1.—N-(3-(cyclohexylamino)propyl)-1,2,3,4,9,9-hexachloro - 1,4,4a,5,6,7,8,8a - octahydro - 1,4 - methanonaphthalene-6,7-dicarboximide 1,2,3,4,9,9 - hexachloro - 1,4,4a,5,6,7,8,8a - octahydro-1,4-methanonaphthalene-6,7-dicarboxylic anhydride (42.5 grams; 0.10 mole) and 3-(cyclohexylamino)propylamine (15.63 grams; 0.10 mole) were mixed with one another in 50 milliliters of dimethylformamide. The resulting reaction mixture was heated to reflux temperature and refluxed for a period of 4 hours, subsequently cooled to room temperature, and added to 400 milliliters of ice-water mixture. A thick syrupy precipitate formed in the mixture and was separated by decanting. The separated precipitate was dried in an oven at 60° C. under subatmospheric pressure for 48 hours. The N-(3-(cyclohexylamino) propyl) - 1,2,3,4,9,9 - hexachloro - 1,4,4a,5,6,7,8,8a - octahydro-1,4-methanonaphthalene-6,7-dicarboximide product thus obtained was a tacky glass. The identity of the product was confirmed by infrared analysis.

Example 2.—N-(3-(cyclohexylamino)propyl)-1,2,3,4,9,9-hexachloro - 1,4,4a,5,6,7,8,8a - octahydro - 1,4 - methanonaphthalene-6,7-dicarboximide hydrochloride The N-(3-(cyclohexylamino)propyl)-1,2,3,4,9,9-hexachloro - 1,4,4a,5,6,7,8,8a - octahydro - 1,4 - methanonaphthalene-6,7-dicarboximide product obtained as reported in Example 1 was dissolved in a quantity of diethyl ether and anhydrous hydrogen chloride passed through the resulting solution. The passage of the hydrogen chloride into the solution resulted in the precipitation of the desired N-(3-(cyclohexylamino)propyl)-1,2,3,4,9,9-hexachloro - 1,4,4a,5,6,7,8,8a - octahydro - 1,4 - methanonaphthalene-6,7-dicarboximide hydrochloride product as a white crystalline precipitate. It was separated by filtration under subatmospheric pressure. The product thus obtained melted with decomposition at 337–338° C. The identity of the product was confirmed by infrared analysis and was further confirmed by elemental analysis, which showed: Found, C, 43.47; H, 4.37; Cl, 41.80; N, 4.50; calculated for $C_{22}H_{26}Cl_6N_2O_2HCl$, C, 44.07; H, 4.54; Cl, 41.38; N, 4.67.

Example 3.—N,N' - (1,2 - cyclobutylenedimethylene)bis (1,2,3,4,9,9 - hexachloro - 1,4,4a,5,6,7,8,8a - octahydro-1,4-methanonaphthalene-6,7-dicarboximide)

1,2,3,4,9,9 - hexachloro - 1,4,4a,5,6,7,8,8a - octahydro-1,4 - methanonaphthalene - 6,7 - dicarboxylic anhydride (212.5 grams; 0.50 mole) and 1,2-cyclobutanedimethylamine (28.5 grams; 0.25 mole) were mixed together in 250 milliliters of dimethylformamide. The resulting mixture was heated to reflux temperature and refluxed for 4 hours. The reaction mixture was then cooled to room temperature, resulting in the precipitation in the reaction mixture of the desired N,N'-(1,2-cyclobutylenedimethylene)bis(1,2,3,4,9,9 - hexachloro - 1,4,4a,5,6,7,8,8a - octahydro-1,4-methanonaphthalene-6,7-dicarboximide) product. The precipitated product was separated by filtration of the reaction mixture under subatmospheric pressure, and the separated product dried under subatmospheric pressure. The product thus obtained melted at 293–295° C. Elemental analysis showed C, 41.20; H, 2.83; Cl, 45.68; N, 3.46; calculated for $C_{32}H_{26}Cl_{12}N_2O_4$, C, 41.41; H, 2.82; Cl, 45.85; N, 3.62.

Other representative products of the present invention include N-((2-(aminomethyl)cyclobutyl)methyl)-1,2,3,4, 9,9 - hexachloro - 1,4,4a,5,6,7,8,8a - octahydro - 1,4-methanonaphthalene-6,7-dicarboximide (an off-white crystalline solid melting with decomposition at 130° C.) and its hydrochloride (having a molecular weight of 557.6).

The products of the present invention are useful as toxicants to control the growth of plants, including higher plants as well as bacteria and fungi. When a product is so employed, the unmodified substance can be utilized. However, the present invention also encompasses the utilization of the substance together with an adjuvant. For example, the substance can be dispersed on a finely divided solid and the resulting preparation employed as a dust. Also, a product of the present invention, or a composition comprising the same and a finely divided solid, can be dispersed in water with the aid of a wetting agent and the resulting aqueous suspension employed as a spray. In other procedures, a product according to the present invention can be employed as the constituent of organic liquid compositions, oil-in-water or water-in-oil emulsions, or water dispersions, with or without the addition of a wetting, dispersing, or emulsifying agent.

In representative operations, a bacteriological culture medium containing 0.05 percent, by weight of N-(3-(cyclohexylamino)propyl) - 1,2,3,4,9,9 - hexachloro - 1,4,4a,5,6, 7,8,8a - octahydro - 1,4 - methanonaphthalene - 6,7 - dicarboximide gave complete inhibition of the growth of *Staphylococcus aureus, Bacillus subtilis,* and *Pullularia pullulans.*

We claim:
1. Compound of the formula

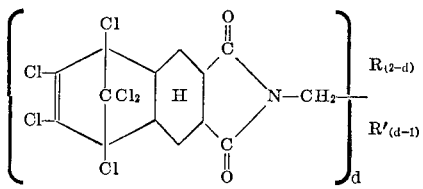

wherein R represents 2-(aminomethyl)cyclobutyl or 2-(cyclohexylamino)ethyl, R' represents cyclobutylene, and $d$ represents an integer of from 1 to 2, both inclusive; and, where $d$ represents 1, the corresponding hydrochloride salt.

2. The compound of claim 1 where $d$ represents 2.
3. The compound of claim 1 wherein $d$ represents 1 and R represents 2-(aminomethyl)cyclobutyl.
4. The compound of claim 1 wherein $d$ represents 1 and R represents 2-(cyclohexylamino)ethyl.
5. The compound of claim 4 as its hydrochloride salt.

References Cited

UNITED STATES PATENTS 3,280,143   10/1966   Hayes _____ 260—326

NICHOLAS S. RIZZO, *Primary Examiner.*

J. A. NARCAVAGE, *Assistant Examiner.*

U.S. Cl. X.R.

161—33, 65; 260—346.3